T. Barrows,

Filter.

No. 103,280.  Patented May 24, 1870.

Witnesses,

H. E. Price.
Wm C. Coly

Inventor,

Thomas Barrows
by his attorney
L. B. Stetson

United States Patent Office.

THOMAS BARROWS, OF BROOKLYN, NEW YORK.*

Letters Patent No. 103,280, dated May 24, 1870.

IMPROVEMENT IN FILTERS.

The Schedule referred to in these Letters Patent and making part of the same.

*To all whom it may concern:*

Be it known that I, THOMAS BARROWS, of Brooklyn, in the county of Kings, and State of New York, have invented certain new and useful Improvements in Filters and their connections; and I do hereby declare that the following is a full and exact description thereof.

My invention is intended for use in the cellar or other convenient part of a house, or of a building for manufacture, or for other purposes, in which the water is required to be delivered either constantly or at intervals in a pure state, and to filter on a large scale, and with little resistance or diminution of the pressure of the water.

I have invented improvements both in the construction of the filter and in the mode of connecting and arranging it.

I will first describe what I consider the best means of carrying out my invention, and will afterward designate the points which I believe to be new.

The accompanying drawings form a part of this specification.

Similar letters of reference indicate corresponding parts in all the figures.

Figure 1:
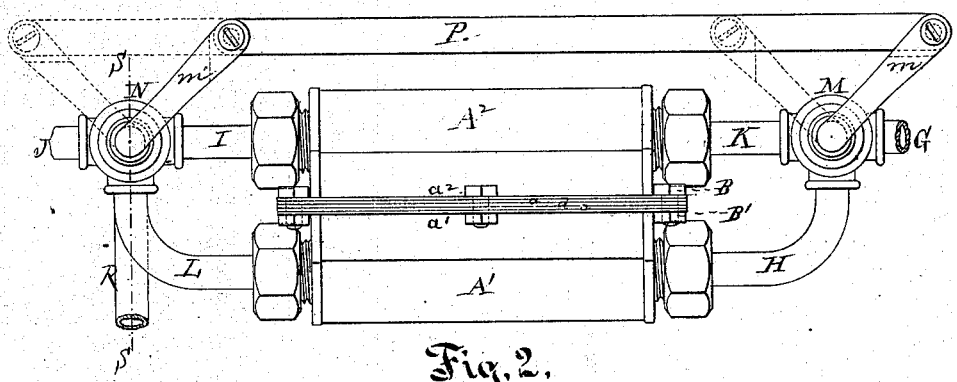
Figure 1 is a side elevation of my improved filter.
Figure 2:
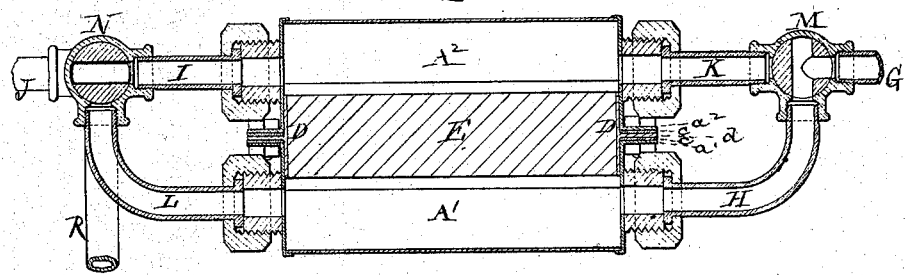
Figure 2 is a longitudinal central section through the same.
Figure 3:
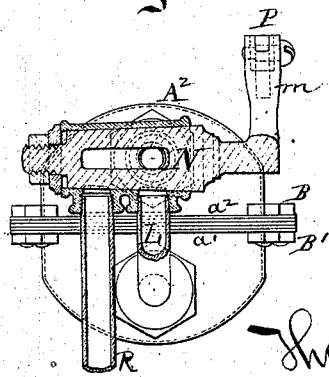
Figure 3 is a cross-section on the line $s\ s$ in fig. 1.

The exterior of my filter is composed mainly of two large shells, of cast-iron or other suitable material, marked respectively $A^1$ and $A^2$.

These shells have flanges $a^1\ a^2$ extending quite around, by means of which they are firmly bolted together by means of the screw-bolts B and nuts B'.

They embrace between them two thicknesses of vulcanized rubber, or analogous soft material, indicated by $c\ c$, and a flange, $d$, of a large case, D, having an outline corresponding with the interior form of the filter.

This case D incloses a thick stratum of filtering material, E, a more particular description of which latter will be given hereafter.

M and N are cocks which control the direction of the water.

The water enters the building through the pipe G, which connects with the street main or other source not represented. On arriving at the cock M it is, as ordinarily worked, allowed to flow downward, and to enter the lower shell $A^1$ through the pipe H. Thence it rises through the filtering material E into the upper shell $A^2$, and thence flows out freely through the pipe I and cock N into the pipe J, which leads upward and distributes the water properly in the house, or for whatever purpose it is intended. This condition continues until the lower surface of the filtering material E has accumulated animalculæ or other solid matter from the continuous filtering of the water.

My invention provides for not only very rapidly and thoroughly cleansing the filtering material, but provides for the effective and convenient removal of the solid impurities.

The levers $m\ m$ of the cocks M N are connected by the bar P, which is loosely riveted to each, so that the turning of one turns the other.

Now, by turning the cocks M and N, or, in other words, shifting the position of the bar P to the left, the flow of water is entirely reversed. The flow through the pipes G and H is arrested, and the full force of the water is turned through the pipe K into the upper shell $A^2$, whence it descends through the filtering material E, washing out all its impurities, and thence flows first through the pipe L into the cock N, and thence downward through the pipe R into the sewer.

I esteem it important to the complete success of my invention that there shall be a sewer, or equivalent drain, at a low level, which shall receive the water freely in a strong stream through the pipe R, and convey it quickly and conveniently away.

After the water has run in this manner for a few minutes, the material E will be thoroughly cleansed, and the cocks may be again placed in their original position, and the current of water will flow as before.

The cock M is a three-way cock, capable of directing the water through either pipe H or K, while it is received freely in either position from the pipe G.

The cock N is a four-way cock. In one position it receives the water from the pipe I, and discharges it into the house pipe J. In the other position the communication between these pipes is closed, and a free communication is opened between the pipes L and R.

It being understood that all my parts may be made of any ordinary or suitable material, and of such sizes as may be preferred for various uses, but that they are best adapted for large sizes where large quantities are to be filtered, and that the connections of the pipes may be made either by couplings, as represented, or by soldering, flanging, or other approved means, I will now direct attention to my peculiar provision for the filtering material.

I propose to use, in most instances, the filtering-stone described in the patent of Frederic C. Krause, February 17, 1863. I form the inclosing-frame, or inner case D $d$ in one piece of cast-iron or other suitable material, and bed or fit the filtering-stone tightly therein with hydraulic lime, mortar, or other strong and water-tight cement. The frame D $d$ and the inclosed stone E are firmly and tightly held between the flanges of the shells, and the arrangement makes, with the packing material $c\ c$, a construction which is cheaply

*Assor to self and G. Purrington Jr., of Mattapoisett, Massachusetts.

and easily made and fitted up, not liable to derangement, and is easily made accessible when desired.

I do not consider it absolutely essential to employ the filtering-stone designated. Any other material which has the proper qualities might be made to serve in its stead; or I can use a loose material, as sand, pulverized charcoal, or any other ordinary or proper material, and can hold it between sheets of wire-gauze sustained by gratings, or other suitable means.

I do not esteem it essential that my filter shall stand in a horizontal position. It may be upright or variously inclined, if preferred; or again, the current may be usually downward, and it may be cleaned by an upward current, if preferred.

Any other modifications in the details may be made by any good mechanic, but I prefer the form and arrangement here represented.

I claim—

1. The flange-frame D $d$, arranged as represented relatively to the inclosed filtering material E, and an inclosing-case, in two parts, $A^1 A^2$, with connections for admitting and discharging the water, and suitable packing $c\ c$, for forming a tight joint therewith, as herein specified.

2. The arrangement of the filtering material E and a suitable inclosing-case, relatively to the street connection G, house connection J, and sewer or cess-pool connection R, with cocks, operated as described for changing the currents at intervals for the purposes specified.

3. The within-described arrangement of the means M for controlling the induction, the means N for controlling the eduction, and the connecting-bar P, relatively to the filter $A^1 A^2$ E and its connections, all as and for the purposes herein set forth.

In testimony whereof I have hereunto set my name in presence of two subscribing witnesses.

THOMAS BARROWS.

Witnesses:
C. C. LIVINGS,
WM. C. DEY.